United States Patent
Fliegl, Sr.

(10) Patent No.: US 9,545,959 B2
(45) Date of Patent: Jan. 17, 2017

(54) TRANSPORT VEHICLE FOR PIECE GOODS

(71) Applicant: Josef Fliegl, Sr., Kastl (DE)

(72) Inventor: Josef Fliegl, Sr., Kastl (DE)

( * ) Notice: Subject to any disclaimer, the term of this patent is extended or adjusted under 35 U.S.C. 154(b) by 14 days.

(21) Appl. No.: 14/710,664

(22) Filed: May 13, 2015

(65) Prior Publication Data

US 2015/0329150 A1    Nov. 19, 2015

(30) Foreign Application Priority Data

May 16, 2014    (DE) .................... 20 2014 102 306 U

(51) Int. Cl.
| | |
|---|---|
| *B62D 33/08* | (2006.01) |
| *B62D 63/06* | (2006.01) |
| *B62D 33/027* | (2006.01) |
| *B60J 5/04* | (2006.01) |

(52) U.S. Cl.
CPC .............. *B62D 33/08* (2013.01); *B60J 5/0498* (2013.01); *B62D 33/0276* (2013.01); *B62D 63/061* (2013.01)

(58) Field of Classification Search
CPC ... B62D 33/08; B62D 33/0276; B62D 63/061; B60J 5/0498
See application file for complete search history.

(56) References Cited

U.S. PATENT DOCUMENTS

2015/0166126 A1*  6/2015  Bryant .................. B62D 33/08
                                                          296/26.13

FOREIGN PATENT DOCUMENTS

| DE | 10 2008 049 135 A1 | 8/2010 |
|---|---|---|
| DE | 20 2007 019 318 U1 | 1/2012 |
| DE | 20 2012 005 798 U1 | 9/2012 |
| EP | 0 346 652 B1 | 4/1993 |
| EP | 2 826 665 A2 | 10/2013 |

\* cited by examiner

*Primary Examiner* — Lori L Lyjak
(74) *Attorney, Agent, or Firm* — Renner Kenner Greive Bobak Taylor & Weber

(57) ABSTRACT

A transport vehicle for piece goods includes a loading platform, a front end wall or a rear end wall or both a front end wall and rear end wall, and at least one side wall. The side wall is movable by an opening device in such a manner that the side wall is first displaceable in the vertical direction of the transport vehicle and is then pivotable about an axis oriented in the longitudinal direction of the transport vehicle.

12 Claims, 5 Drawing Sheets

TRANSPORT VEHICLE FOR PIECE GOODS

CROSS REFERENCE TO RELATED APPLICATIONS

This application claims the benefit of German Patent Application No. 20 2014 102 306.2, filed May 16, 2014, and incorporated herein by reference.

TECHNICAL FIELD

The invention relates to a transport vehicle for piece goods which can in particular be in the form of compressed bales, such as, for example, hay, straw or silage bales.

BACKGROUND OF THE INVENTION

A transport vehicle for compressed bales of straw or silage is known from DE 20 2007 019 318 U1, in which transport vehicle a loading platform is delimited by end walls and side walls. For loading and unloading the transport vehicle, the side walls can be lowered into an open position, near the ground, in which they are arranged beneath the loading platform. In the transport position, an open region remains between the bottom edge of the side walls and the loading platform, which open region can be secured by means of additional, folding side panels or securing elements, in particular in the form of flexible holding elements such as tarpaulins or ropes or nets.

So-called wing body parts of lorries are additionally known (see DE 10 2008 049 135 A1). These are wall parts of the closed body of the lorry which have an L-shaped cross-section and each comprise a side wall and a section of the roof wall of the body. In the region of the ends that are formed by the sections of the roof wall, the wing body parts are pivotably mounted about an axis which is oriented in the longitudinal direction of the lorry. By means of opening devices, which are generally in the form of hydraulic or pneumatic cylinders, the wing body parts can be pivoted upwards for loading and unloading the lorry. A disadvantage of such a form of side walls that are to be opened is the comparatively large lateral space requirement which is necessary for pivoting of the wing body parts. If that space is not available, the lorry cannot be loaded and unloaded or can be loaded and unloaded to only a very limited extent. In any case, a space requirement in the vertical direction is also necessary for opening the L-shaped wing body parts, which space requirement is significantly higher than the overall height of the body in the closed state. If that space is not available, the lorry again cannot be loaded and unloaded or can be loaded and unloaded to only a limited extent.

Starting from this prior art, the object underlying the invention was to provide a transport vehicle for piece goods which can be loaded and unloaded in an advantageous manner. In particular, the transport vehicle is to permit advantageous loading of the piece goods with different load heights and is to be capable of being loaded and unloaded in confined space conditions.

The object is achieved by means of a transport vehicle according to claim 1. Advantageous embodiments thereof are the subject of the dependent claims and will become apparent from the following description of the invention.

SUMMARY OF THE INVENTION

The invention is based on the idea of improving the loading capability of a transport vehicle in that an opening movement of the side walls (into a fully open position) which comprises both lifting and pivoting in the direction of a horizontal orientation is divided into those two partial movements and those partial movements do not necessarily have to take place simultaneously.

A transport vehicle of the generic type for piece goods, in particular in the form of compressed bales, such as, for example, hay, straw or silage bales, having a loading platform, a front end wall and/or a rear end wall and at least one side wall which preferably has a vertical orientation in a closed position delimiting the loading platform, is accordingly characterised according to the invention in that the side wall is first displaceable by means of an (at least one) opening device in the vertical direction of the transport vehicle and is then pivotable (outwards) about an axis oriented in the longitudinal direction of the transport vehicle.

The displacement in the vertical direction can thereby take place purely translationally and/or the pivoting can be performed as a pure rotation. In addition, the displacement of the side wall can optionally take place until an intermediate end position is reached. "Intermediate end position" is understood as meaning that no further displacement in the vertical direction is possible.

According to the invention, in order to open the side wall it is not necessary that the side wall is always first displaced in the vertical direction and then pivoted, in particular into a fully open position. Only the structural form of the transport vehicle such that such a sequence of movements is possible or executable is fundamental to the invention.

The transport vehicle according to the invention can preferably have two side walls, both of which are preferably correspondingly to be opened. It is thus possible to load the transport vehicle from both sides.

In one embodiment of the transport vehicle according to the invention, it can be provided that both the displacement and the subsequent pivoting of the side wall are carried out by means of the same opening device. In particular, it can then also be provided that a displacement into an intermediate end position takes place first, and when that position has been reached, only a pivoting movement is provided. Such a form of the transport vehicle according to the invention can be distinguished in that the lateral space requirement for opening the side wall near the ground is reduced, because pivoting does not occur until later.

The lateral space requirement can additionally be further reduced if, as is preferably provided in principle, the side wall upon displacement in the vertical direction is also moved towards a longitudinal vertical plane (defined by the longitudinal axis of the vehicle and the vertical axis of the vehicle) of the transport vehicle, that is to say towards the vehicle centre (based on the transverse direction) of the transport vehicle.

The transport vehicle according to the invention can be loaded and unloaded in a particularly advantageous manner when the displacement of the side wall in the vertical direction can be carried out by means of a first opening device and the pivoting can be carried out by means of a second opening device, wherein the first opening device and the second opening device can be operated independently of one another. As a result, a particularly variable loading and unloading capability of the transport vehicle can be achieved, and in particular the opening movement of the side wall can be adapted as exactly as possible to space present at the side of and above the transport vehicle. For example, it can be provided that, in very constricted lateral space conditions, the side wall is only displaced in the vertical direction and is not pivoted. If that displacement in the vertical direction is additionally associated with a movement of the side wall towards the vehicle centre, pivoting of the side wall until the space available at the side is utilised as far as possible can optionally also be possible. On the other hand, it can also be provided that, when there is only a very small amount of space available above the transport vehicle, the side wall is only pivoted or is first pivoted and then displaced slightly in the vertical direction.

The opening device and in particular the first opening device and/or the second opening device can preferably comprise at least one hydraulic or pneumatic cylinder. These are distinguished by a comparatively small space requirement while at the same time being very efficient. In addition, a hydraulic or pneumatic pressure source that is frequently already present in commercial vehicles can be used for their operation. Other forms of the opening device(s) are also possible, however, in particular with an electromotive drive, such as, for example, in the form of a spindle or another electromotive linear drive.

In order to achieve an advantageous loading and unloading capability of the transport vehicle, it can preferably be provided that the side wall is pivotable at least into a horizontal orientation by means of the opening device, in particular the second opening device.

A structurally advantageous form of the transport vehicle, by means of which the intended movability of the side wall can be achieved, can provide a carrier structure which is connected to the front end wall and/or to the rear end wall and to which there is fixed in a rotatable manner a carrier arm for the side wall, the carrier arm also being connected in a rotatable manner to the side wall.

The carrier structure can thereby extend upwards beyond the front end wall and/or the rear end wall in order to achieve a desired load height for the transport vehicle, without the front and/or rear side wall itself having to be made correspondingly high.

In addition, the carrier structure can be connected to the front end wall and/or to the rear end wall centrally in the transverse direction of the transport vehicle, which can have structural advantages in particular when two side walls are provided which are correspondingly to be opened.

In one embodiment of the transport vehicle according to the invention having a first and a second opening device, it can preferably be provided that the first opening device is supported between the carrier structure and the carrier arm while, further preferably, the second opening device is supported between the carrier structure and the side wall. As a result, the different movements of the side wall effected by the two opening devices can be carried out in a structurally simple manner, while both opening devices are advantageously each supported on the carrier structure.

Particularly preferably, it can also be provided that the distances between the axes of rotation of the rotatable fixings of the carrier arm and of the second opening device to the carrier structure on the one hand and to the side wall on the other hand are identical. As a result, it can optionally be achieved that the side wall is moved purely translationally during the displacement in the vertical direction.

In a further preferred embodiment of the transport vehicle according to the invention, a locking device for the side wall can further be provided, by means of which locking device unintentional opening in the closed position, in particular as a result of a laterally directed load by the piece goods, is prevented. A structurally simple and functionally advantageous form of such a locking device can be obtained if it is configured in such a manner that it can be unlocked and/or locked automatically by the displacement of the side wall.

BRIEF DESCRIPTION OF THE DRAWINGS

The invention will be explained in greater detail below by means of an embodiment shown in the drawings, in which.

DETAILED DESCRIPTION OF ILLUSTRATIVE EMBODIMENTS

Figure 1:
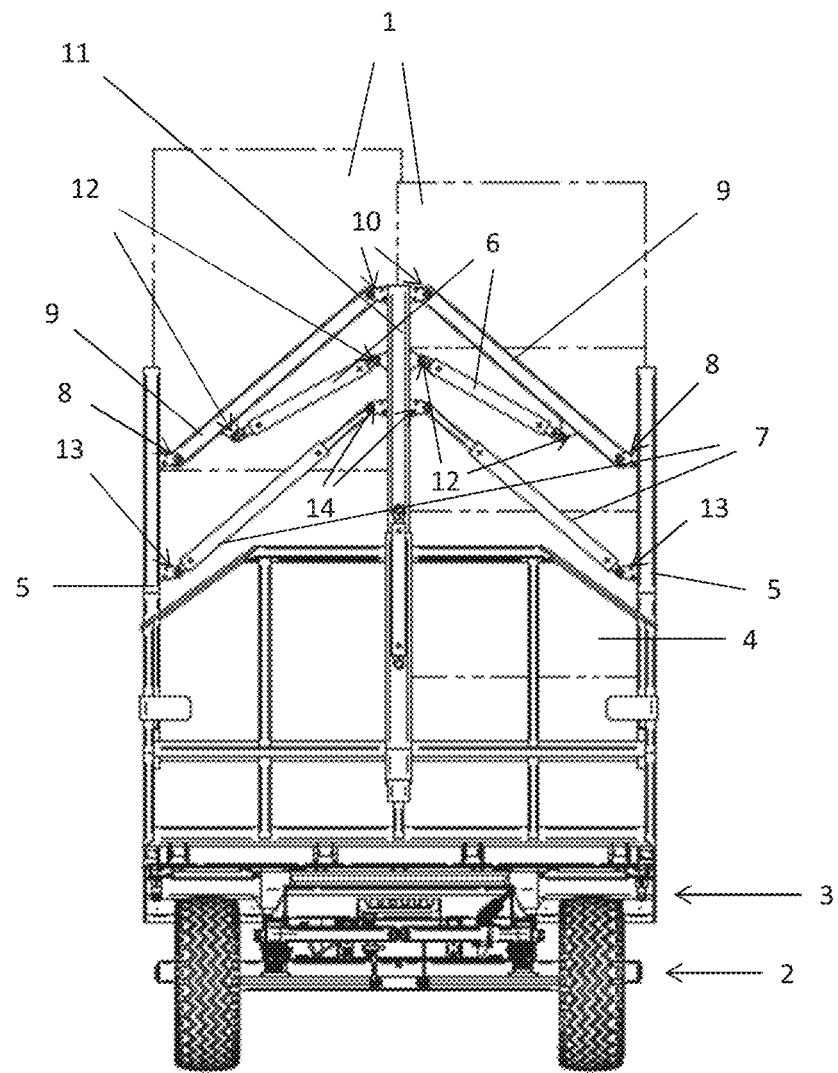
FIG. 1 is a view from behind of a transport vehicle according to the invention with the side walls in the closed position.

The transport vehicle for piece goods 1 shown in FIG. 1 comprises a chassis 2 and a loading platform 3 arranged above the chassis 2. The loading platform 3 is delimited at the front and rear end by an end wall 4. In the lateral, that is to say transverse direction of the transport vehicle, the loading platform 3 is additionally delimited on both sides by side walls 5, provided they are in their closed positions, as is shown in FIG. 1.

For loading and unloading the loading platform 3 and hence the transport vehicle, each of the side walls 5 can be moved into a plurality of open positions. This is carried out in each case by means of two first opening devices 6 and two second opening devices 7 for each of the side walls 5, a first opening device 6 and a second opening device 7 in each case being arranged in the region of the front end and in the region of the rear end of each side wall 5. All the opening devices 6, 7 are in the form of hydraulic cylinders.

In the region of both the front end and the rear end of the transport vehicle, the side walls 5 are each connected to a carrier arm 9 by means of a first pivot joint 8 (rotatable about at least one axis oriented in the longitudinal direction of the transport vehicle), which carrier arm is in turn connected to a carrier structure 11 by means of a second pivot joint 10 (rotatable about at least one axis oriented in the longitudinal direction of the transport vehicle). The carrier structure 11 is in the form of a vertically oriented carrier beam which is connected centrally (with respect to the transverse direction of the transport vehicle) to the associated end wall 4. The connection between the carrier beams and the associated carrier arms 9 is made at the free ends of the carrier beams.

A hydraulic cylinder serving as the first opening device 6 is supported on each of the support arms 9 with one of its ends, while the other end, spaced apart from the respective associated second pivot joint 10, is supported on the carrier structure 11. The connection between the first opening devices 6 and the carrier arms 9 on the one hand and the carrier structures 11 on the other hand is thereby likewise rotatable about axes oriented in the longitudinal direction of the transport vehicle, for which purpose corresponding pivot joints 12 are provided.

The hydraulic cylinders of the second opening devices 7 are each connected by means of a third pivot joint 13 to the associated side walls 5 and by means of a fourth pivot joint 14 to the associated carrier structures 11. The third pivot joints 13 are thereby arranged spaced apart from the adjacent first pivot joints 8, and the fourth pivot joints 14 are arranged spaced apart from the adjacent second pivot joints 10. It is provided that the distances between the first pivot joint 8 and the third pivot joint 13, on the one hand, and the second pivot joint 10 and the fourth pivot joint 14, on the other hand, are substantially identical. A parallelogram kinematics is thereby achieved for the side walls 5 upon displacement by means of the first opening devices 6 (and when the hydraulic cylinders of the second opening devices are fully retracted).

The form according to the invention of the transport vehicle permits variable opening of the side walls 5 in order to be able to load and unload the loading platform 3. Merely by way of example, FIGS. 2 to 5 show different open positions into which the side walls can be moved in the case of opening to a fully open position (see FIG. 5).

Figure 2:
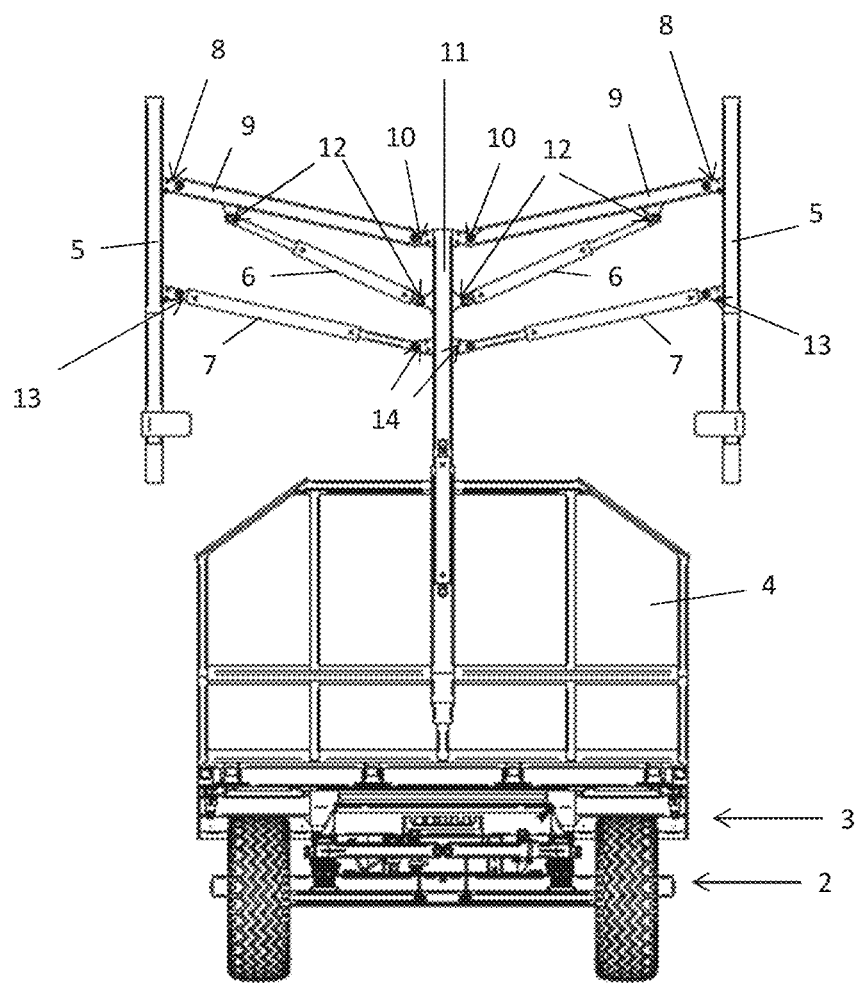
FIG. 2 shows the transport vehicle according to FIG. 1 in a first open position.

FIG. 2 shows a first open position which is achieved by operation of the first opening devices 6, that is to say partial extension of the corresponding hydraulic cylinders. It will be seen that the side walls 5, starting from the closed position according to FIG. 1 in which they are oriented substantially vertically and all the hydraulic cylinders are fully retracted, are moved substantially purely translationally upon operation of the first opening devices, these movements being executed according to parallelogram kinematics. This parallelogram kinematics also results in the side walls 5 being moved during the displacement not only in the vertical direction but also in the transverse direction. This takes place, starting from the closed position, first outwards, that is to say away from the loading platform 3, until the carrier arms 9 and the hydraulic cylinders of the second opening devices 7 have reached a horizontal orientation. As displacement is continued, a movement of the side walls 5 then takes place with a movement component in the transverse direction inwards, that is to say into the space arranged above the loading platform 3.

Figure 3:
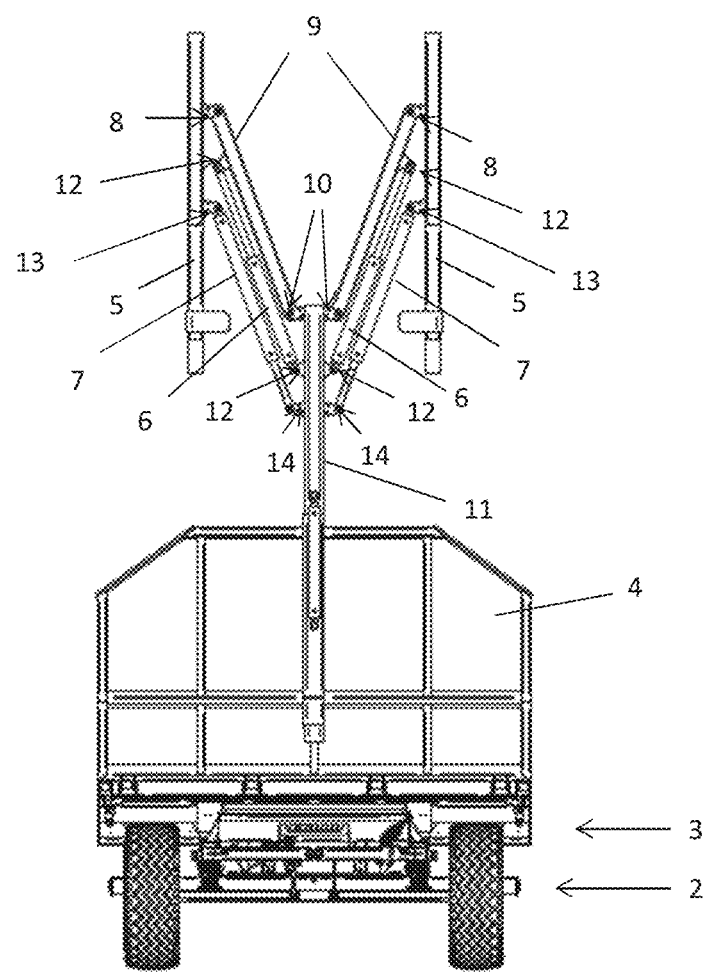
FIG. 3 shows the transport vehicle according to FIG. 1 in a second open position.

The open position shown in FIG. 3 represents an intermediate end position. In this position, the hydraulic cylinders of the first opening devices 6 are fully extended, while the hydraulic cylinders of the second opening devices 7 are still fully retracted. As a result of the parallelogram kinematics, the side walls 5 are also oriented vertically in this intermediate end position and have additionally been moved, to the relevant extent, transversely towards the vehicle centre.

Figure 4:
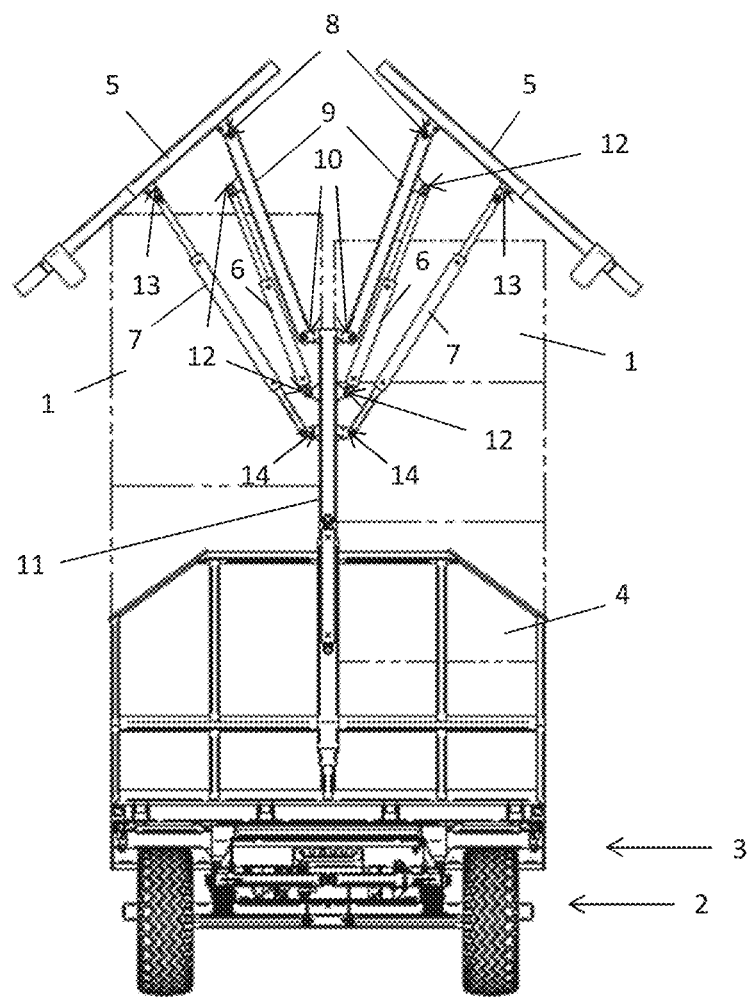
FIG. 4 shows the transport vehicle according to FIG. 1 in a third open position.
Figure 5:
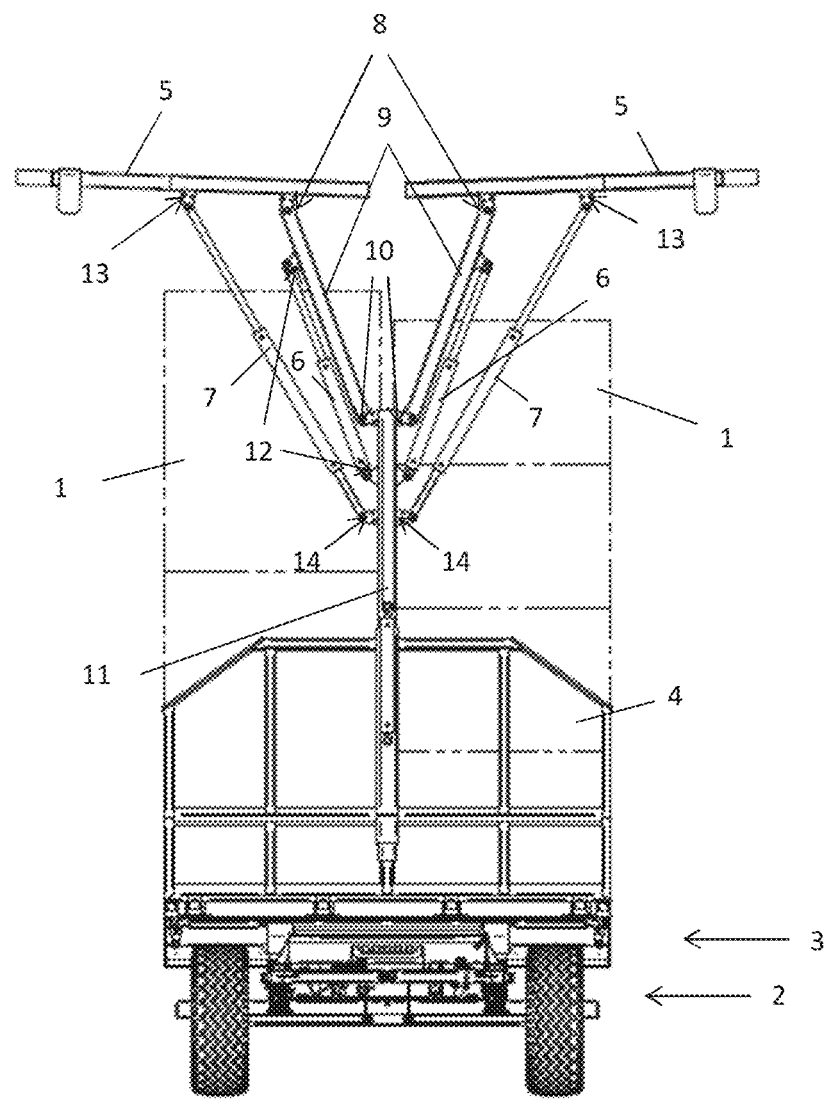
FIG. 5 shows the transport vehicle according to FIG. 1 in a fourth open position.

FIG. 4 shows how, starting from the intermediate end position according to FIG. 3, the hydraulic cylinders of the second opening devices 7 are extended, as a result of which the side walls 5 are pivoted about the axes of rotation formed by second pivot joints 10. The side walls 5 are in this manner moved as far as possible out of the space above the loading platform, so that the transport vehicle can be loaded as high as possible with the piece goods 1. This can take place, for example, up to a legally permissible maximum height of 4 m. FIG. 5 shows the orientation of the side walls 5 in the fully open position in which all the hydraulic cylinders of the first opening devices 6 and of the second opening devices 7 are fully extended. The side walls 5 thereby have an approximately horizontal orientation.

As is apparent from FIGS. 4 and 5, when the transport vehicle is loaded to the maximum height, the side walls 5 cannot be moved back into the closed positions according to FIG. 1 along exactly the reverse path to that described above (by way of example) in the case of opening, because the side walls 5 would collide with the load if the hydraulic cylinders of the second opening devices 7 were fully retracted first. Instead, it can be provided that the hydraulic cylinders of the first opening devices 6 are first retracted at least until the second pivot joints 10 formed between the side walls 5 and the carrier arms 9 have passed the upper side edges of the load. The side walls 5 can then be pivoted into the vertical orientation again by retraction of the hydraulic cylinders of the second opening devices 7. The side walls 5 can then be moved into the fully closed positions according to FIG. 1 by fully retracting the hydraulic cylinders of the first opening devices 6.

Of course, it is possible to allow at least sections of these partial movements effected by the first and second opening devices 6, 7 to take place simultaneously.

It is preferably provided that a final section of the movements of the side walls into the fully closed position and a first section of the movements of the side walls out of the fully closed position are carried out solely by a displacement by means of the first opening devices 6. As a result, automatic locking and unlocking of a locking device for the side walls 5 can be effected, for example by locking bolts arranged on the side walls 5 being moved into or out of associated locking grooves during this final or first section, respectively, of the movements of the side walls.

A further advantage of the transport vehicle is that, as a result of the concrete form of the mechanics constituted by the carrier arms 9, by the hydraulic cylinders of the first opening device 6 and of the second opening device 7 and by the carrier structure, it is ensured that, if the hydraulic system controlling the hydraulic cylinders should fail, the side walls 5, provided they are positioned in the closed position according to FIG. 1, remain closed and cannot open by themselves. Should the hydraulic system fail when the side walls 5 are open, the mechanics additionally ensures that the side walls are moved into the closed position under the effect of gravity.

LIST OF REFERENCE NUMERALS 1. piece goods
2. chassis
3. loading platform
4. end wall
5. side wall
6. first opening device
7. second opening device
8. first pivot joint
9. carrier arm
10. second pivot joint
11. carrier structure
12. pivot joint
13. third pivot joint
14. fourth pivot joint

The invention claimed is:

1. Transport vehicle for piece goods having a loading platform, a front end wall or a rear end wall or both a front end wall and a rear end wall, and at least one side wall,
   characterised in that the at least one side wall is movable by means of an opening device in such a manner that the at least one side wall is first displaceable in the vertical direction of the transport vehicle and is then pivotable about an axis oriented in the longitudinal direction of the transport vehicle.

2. Transport vehicle according to claim 1, characterised in that the at least one side wall is displaceable in the vertical direction by means of a first opening device and is pivotable by means of a second opening device.

3. Transport vehicle according to claim 1, characterised in that the at least one side wall is displaceable purely translationally in at least one movement section.

4. Transport vehicle according to claim 1, characterised in that the at least one side wall has a vertical orientation in a closed position delimiting the loading platform.

5. Transport vehicle according to claim 1, characterised in that the at least one side wall, when displaced in the vertical direction, is also moved in the transverse direction of the transport vehicle.

6. Transport vehicle according to claim 1, characterised in that the at least one side wall is pivotable into a horizontal orientation.

7. Transport vehicle according to claim 1, characterised by a carrier structure which is connected to the front end wall or to the rear end wall or to both the front end wall and the rear end wall, and to which there is fixed in a rotatable manner a carrier arm for the at least one side wall, the carrier arm being connected in a rotatable manner to the at least one side wall.

8. Transport vehicle according to claim 7, characterised in that the carrier structure extends upwards beyond the front end wall or the rear end wall or both the front end wall and the rear end wall.

9. Transport vehicle according to claim 7, characterised in that the carrier structure is connected to the front end wall or to the rear end wall or to both the front end wall and the rear end wall centrally in the transverse direction of the transport vehicle.

10. Transport vehicle according to claim 2 further comprising a carrier structure which is connected to the front end wall or to the rear end wall or to both the front end wall and the rear end wall, and to which there is fixed in a rotatable manner a carrier arm for the at least one side wall, the carrier arm being connected in a rotatable manner to the at least one side wall, and further characterised in that the first opening device is supported between the carrier structure and the carrier arm.

11. Transport vehicle according to claim 2 further comprising a carrier structure which is connected to the front end wall or to the rear end wall or to both the front end wall and the rear end wall, and to which there is fixed in a rotatable manner a carrier arm for the at least one side wall, the carrier arm being connected in a rotatable manner to the at least one side wall, and further characterised in that the second opening device is supported between the carrier structure and the at least one side wall.

12. Transport vehicle according to claim 11, characterised in that the second opening device is fixed in a rotatable manner to the carrier structure and to the at least one side wall, and the distances between the axes of rotation of the rotatable fixings of the carrier arm and of the second opening device to the carrier structure on the one hand and to the at least one side wall on the other hand are equal.

* * * * *